(12) United States Patent
Qin

(10) Patent No.: US 12,499,787 B2
(45) Date of Patent: Dec. 16, 2025

(54) DISPLAY MODULE AND MANUFACTURING METHOD THEREOF, AND DISPLAY APPARATUS

(71) Applicant: WUHAN CHINA STAR OPTOELECTRONICS SEMICONDUCTOR DISPLAY TECHNOLOGY CO., LTD., Wuhan (CN)

(72) Inventor: Lijun Qin, Wuhan (CN)

(\*) Notice: Subject to any disclaimer, the term of this patent is extended or adjusted under 35 U.S.C. 154(b) by 734 days.

(21) Appl. No.: 17/599,592

(22) PCT Filed: Jul. 22, 2021

(86) PCT No.: PCT/CN2021/107791
§ 371 (c)(1),
(2) Date: Sep. 29, 2021

(87) PCT Pub. No.: WO2022/262069
PCT Pub. Date: Dec. 22, 2022

(65) Prior Publication Data
US 2024/0029591 A1    Jan. 25, 2024

(30) Foreign Application Priority Data
Jun. 16, 2021 (CN) .......................... 202110667800.9

(51) Int. Cl.
*G09F 9/30* (2006.01)
*G06F 1/16* (2006.01)
*H10K 77/10* (2023.01)
*H10K 102/00* (2023.01)

(52) U.S. Cl.
CPC ............ *G09F 9/301* (2013.01); *G06F 1/1652* (2013.01); *H10K 77/111* (2023.02); *H10K 2102/311* (2023.02)

(58) Field of Classification Search
None
See application file for complete search history.

(56) References Cited

U.S. PATENT DOCUMENTS

| 2015/0160390 A1* | 6/2015 | Goyal ................... G06F 1/1605 359/483.01 |
| 2018/0013095 A1* | 1/2018 | Choi .................... H10K 50/844 |
| 2018/0182829 A1* | 6/2018 | Shin ...................... H10K 59/131 |

(Continued)

FOREIGN PATENT DOCUMENTS

| CN | 111968521 A | 11/2020 |
| CN | 112017540 A | 12/2020 |

(Continued)

*Primary Examiner* — Anthony J Frost

(57) ABSTRACT

A display module, a manufacturing method thereof and a display apparatus are provided. The display module includes a substrate, a display function layer, a support layer, a buffer layer and a first adhesive layer, wherein the substrate includes a display section and an extending section that are arranged oppositely, and a bending section that is bent to connect the display section and the extending section and is located in the non-display region. A distance from an end of the first adhesive layer away from the non-display region to the non-display region is greater than or equal to a distance from an end of the buffer layer away from the non-display region to the non-display region.

9 Claims, 4 Drawing Sheets

(56) References Cited

U.S. PATENT DOCUMENTS

2019/0036075 A1 1/2019 Jiang
2021/0367189 A1* 11/2021 Hwang .................. H10K 59/87

FOREIGN PATENT DOCUMENTS

| CN | 112071197 A | 12/2020 | | |
|----|-------------|---------|---|---|
| CN | 112530295 A | 3/2021 | | |
| CN | 112820199 A | 5/2021 | | |
| CN | 213183388 U | 5/2021 | | |
| CN | 113140158 A | 7/2021 | | |
| KR | 20170047713 A | * | 5/2017 | ............. G09F 9/301 |

* cited by examiner

DISPLAY MODULE AND MANUFACTURING METHOD THEREOF, AND DISPLAY APPARATUS

BACKGROUND

Technical Field

This application relates to the field of display modules, and in particular, to a display module and a manufacturing method thereof, and a display apparatus.

Related Art

As electronic devices show the development trend of gradually pursuing lightness and thinness, and a narrow bezel, bonding of a bottom frame of a display module restricts the development toward a narrow bezel of a mobile phone due to restrictions of flexible printed circuit (FPC) and gate driver on array (GOA) wiring and arrangement.

At present, in the market, the FPC and GOA wiring is mainly bent to the back of a screen body by a terminal bending process to perform bonding to achieve a narrow bezel effect. In order to further reduce the width of the bezel, when the display module is bonded by the terminal bending process, a minimum bending radius is pursued, that is, the thickness of the display module is also required to be reduced accordingly. The thickness of the display module is affected by the thickness of materials of the module, and the degree of reduction is limited. In addition, while thinness of some materials of the module is pursued, some material performance losses will be brought.

At present, in order to reduce the thickness of a buffer layer, the thickness of a foam cushion layer in the buffer layer is reduced or a polyimide film layer in the buffer layer is removed, leading to a decrease in compression resistance of the buffer layer, and to have obvious prints on an adhesive layer on the display module after bonding, severely affecting the appearance of a product.

SUMMARY

Technical Problem

Embodiments of this application provide a display module and a manufacturing method thereof, and a display apparatus, to solve the technical problem that in a conventional terminal bending process, in order to achieve a narrow bezel effect, excessive thinning of a buffer layer leads to obvious prints on an adhesive layer on the display module, which affects the appearance of display module products.

Technical Solution

To solve the above problem, technical solutions provided by this application are as follows:

This application provides a display module, comprising a display region and a non-display region, and comprising:
a substrate, comprising a display section and an extending section that are arranged oppositely, and a bending section that is bent to connect the display section and the extending section and is located in the non-display region;
a display function layer, disposed on a side of the display section away from the extending section and located in the display region;
a support layer, disposed on a side of the substrate away from the display function layer, and comprising a first support layer arranged on a side of the extending section close to the display section and a second support layer arranged on a side of the display section close to the extending section;
a buffer layer, disposed on a side of the second support layer away from the substrate; and
a first adhesive layer, disposed on the first support layer and between the first support layer and the buffer layer, wherein a distance from an end of the first adhesive layer away from the non-display region to the non-display region is greater than or equal to a distance from an end of the buffer layer away from the non-display region to the non-display region.

In an embodiment, a projection of the first adhesive layer in a direction perpendicular to the buffer layer covers a projection of the first support layer in the direction perpendicular to the buffer layer.

In an embodiment, the projection of the first adhesive layer in the direction perpendicular to the buffer layer overlaps with the projection of the first support layer in the direction perpendicular to the buffer layer.

In an embodiment, a material of the first adhesive layer comprises a pressure sensitive adhesive.

In an embodiment, a second adhesive layer is disposed between the second support layer and the buffer layer, and a projection of the second adhesive layer in a direction perpendicular to the buffer layer covers at least a projection of the second support layer in the direction perpendicular to the buffer layer.

In an embodiment, the projection of the second adhesive layer in the direction perpendicular to the buffer layer overlaps with the projection of the second support layer in the direction perpendicular to the buffer layer.

In an embodiment, the display module further comprises a strained adhesive layer, the strained adhesive layer is disposed on a side of the substrate away from the support layer, and the strained adhesive layer covers at least the bending section.

In an embodiment, a material of the first adhesive layer comprises a pressure sensitive adhesive or a foam adhesive.

In an embodiment, a material of the buffer layer comprises stainless steel, a foam cushion, or a polyimide film.

This application further provides a manufacturing method of a display module, comprising the following steps:
providing a substrate, where the display module comprises a display region and a non-display region, and the substrate comprises a display section and an extending section, and a bending section that is bent to connect the display section and the extending section and is located in the non-display region;
forming a display function layer located in the display region on a side of the display section away from the extending section;
forming a support layer on a side of the substrate away from the display function layer, where the support layer comprises a first support layer formed on a side of the extending section close to the display section and a second support layer formed on a side of the display section close to the extending section, forming a buffer layer on a side of the second support layer away from the substrate, and forming a first adhesive layer on a side of the first support layer away from the substrate; and
bending the bending section, to arrange the display section and the extending section oppositely, and to laminate the first adhesive layer and the buffer layer, wherein a distance from an end of the first adhesive layer away from the non-display region to the non-display region is greater than or equal to a distance from an end of the buffer layer away from the non-display region to the non-display region.

In an embodiment, in the step of forming a support layer on a side of the substrate away from the display function layer, wherein the support layer comprises a first support layer formed on a side of the extending section close to the display section, and forming a first adhesive layer on a side of the first support layer away from the substrate:

the first support layer and the first adhesive layer are formed by the same patterning process, so that the projection of the first adhesive layer in the direction perpendicular to the buffer layer is coincident with the projection of the first support layer in the direction perpendicular to the buffer layer.

This application further provides a display apparatus, comprising a display module, wherein the display module comprises a display region and a non-display region, and comprises:

a substrate comprising a display section and an extending section that are arranged oppositely, and a bending section that is bent to connect the display section and the extending section and is located in the non-display region;

a display function layer, arranged on a side of the display section away from the extending section and located in the display region;

a support layer, arranged on a side of the substrate away from the display function layer, and comprising a first support layer arranged on a side of the extending section close to the display section and a second support layer arranged on a side of the display section close to the extending section;

a buffer layer, arranged on a side of the second support layer away from the substrate; and a first adhesive layer, arranged on the first support layer and between the first support layer and the buffer layer, where, a distance from an end of the first adhesive layer away from the non-display region to the non-display region is greater than or equal to a distance from an end of the buffer layer away from the non-display region to the non-display region.

In an embodiment, a projection of the first adhesive layer in a direction perpendicular to the buffer layer covers a projection of the first support layer in the direction perpendicular to the buffer layer.

In an embodiment, the projection of the first adhesive layer in the direction perpendicular to the buffer layer overlaps with the projection of the first support layer in the direction perpendicular to the buffer layer.

In an embodiment, a material of the first adhesive layer comprises a pressure sensitive adhesive.

In an embodiment, a second adhesive layer is arranged between the second support layer and the buffer layer, and a projection of the second adhesive layer in a direction perpendicular to the buffer layer covers at least a projection of the second support layer in the direction perpendicular to the buffer layer.

In an embodiment, the projection of the second adhesive layer in the direction perpendicular to the buffer layer overlaps with the projection of the second support layer in the direction perpendicular to the buffer layer.

In an embodiment, the display module further comprises a strained adhesive layer, the strained adhesive layer is arranged on a side of the substrate away from the support layer, and the strained adhesive layer covers at least the bending section.

In an embodiment, a material of the first adhesive layer comprises a pressure sensitive adhesive or a foam adhesive.

In an embodiment, a material of the buffer layer comprises stainless steel, a foam cushion, or a polyimide film.

Beneficial Effect

A support layer is arranged on a side of the substrate away from the display function layer, where the support layer includes a first support layer arranged on a side of the extending section close to the display section and a second support layer arranged on a side of the display section close to the extending section; and a buffer layer is arranged on a side of the second support layer away from the substrate, and a first adhesive layer is arranged on the first support layer and between the first support layer and the buffer layer, where a distance from an end of the first adhesive layer away from the non-display region to the non-display region is greater than or equal to a distance from an end of the buffer layer away from the non-display region to the non-display region. Therefore, the lamination area of the first adhesive layer and the buffer layer is effectively increased, and the pressure is reduced in the subsequent lamination process, thereby solving the problem that in a conventional terminal bending process, in order to achieve a narrow bezel effect, excessive thinning of the buffer layer leads to a decrease in the compression resistance of the buffer layer and to have obvious prints on a first adhesive layer in a display region of a display module, improving the appearance yield of the display module.

BRIEF DESCRIPTION OF THE DRAWINGS

Technical solutions and other beneficial effects of this application will be made obvious by describing the specific implementations of this application in detail with reference to the following accompanying drawings.

DETAILED DESCRIPTION

This application provides a display module and a manufacturing method thereof, and a display apparatus. In order to make objectives, technical solutions, and effects of this application clearer, the following will further describe this application in detail with reference to the accompanying drawings and embodiments. It should be understood that the specific embodiments described herein are only used to explain, rather than limit, this application.

The embodiments of this application provide the display module and the manufacturing method, the display apparatus thereof. Detailed description is given below. It should be noted that the order of description in the following embodiments is not used as a limitation on the preferred order of the embodiments.

Figure 1:
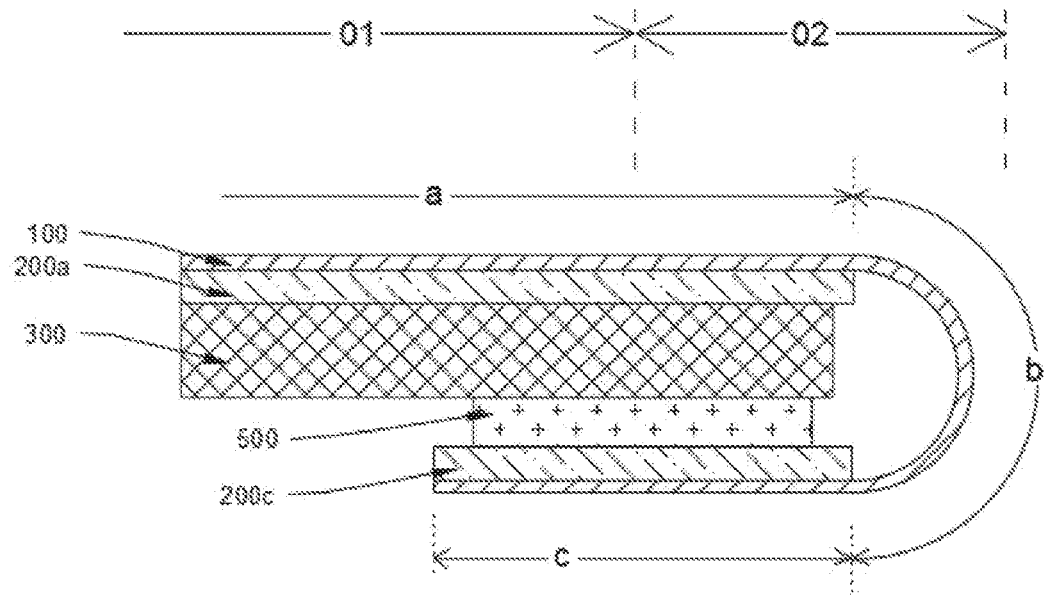
FIG. 1 is a schematic diagram of a structure of a display module in the conventional technology of this application.

At present, as shown in FIG. 1, when the display module is bonded through a terminal bending process, in order to reduce the width of a bezel, a minimum bending radius is pursued, that is, the thickness of the display module is also required to be reduced accordingly. However, the thickness of the display module is affected by the thickness of materials of the display module, and the degree of reduction is limited. In addition, while thinness of some materials of the display module is pursued, some material performance losses will be brought.

At present, in order to reduce the thickness of a buffer layer 300, the thickness of a foam cushion layer in the buffer layer 300 is reduced or a polyimide film layer in the buffer layer is removed generally, leading to a decrease in compression resistance of the buffer layer 300, and to have obvious prints on an adhesive layer 500 on the display module after binding, severely affecting the appearance of products. Therefore, there is a need for a display module that can reduce the thickness of the buffer layer 300 and prevent the adhesive layer 500 from showing prints of the adhesive layer 500 on the display module due to the reduction of the compression resistance of the excessively thin buffer layer 300 in the subsequent binding and lamination process, affecting the appearance of the product.

The technical solutions of this application will be described with reference to specific embodiments, as specifically shown in FIG. 2 to FIG. 7.

Figure 2:
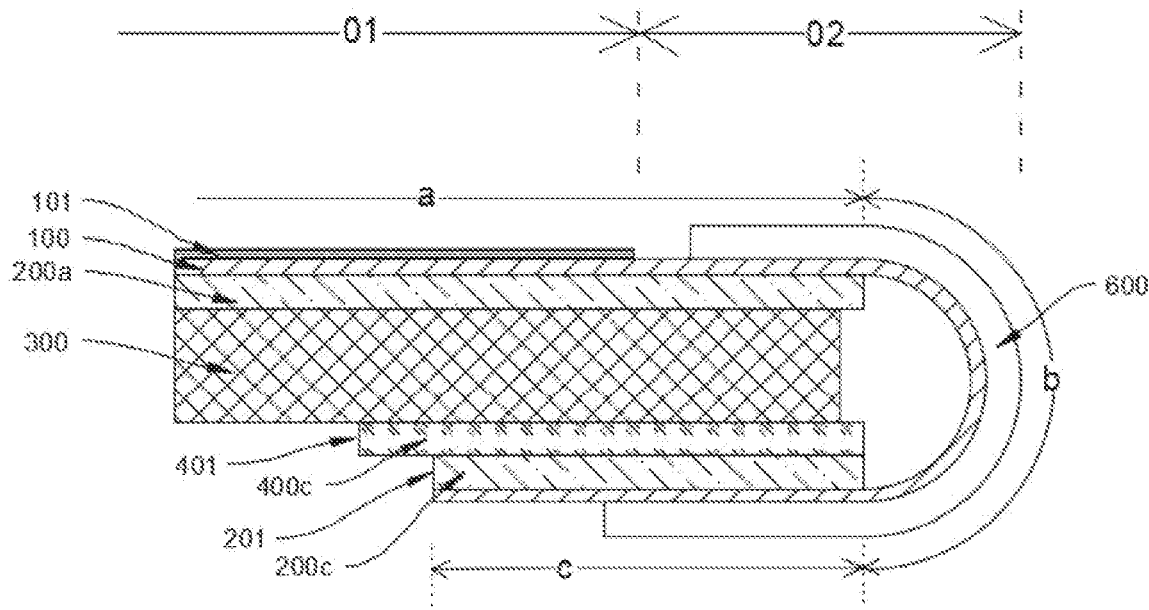
FIG. 2 is a schematic diagram of a structure of a display module in an embodiment of this application.

This application provides a display module, as shown in FIG. 2, including a display region 01 and a non-display region 02, and the display module includes:
- a substrate 100, including a display section a and an extending section c that are arranged oppositely, and a bending section b that is bent to connect the display section a and the extending section c and is located in the non-display region 02;
- a display function layer 101, arranged on a side of the display section a away from the extending section c and located in the display region 01;
- a support layer, arranged on a side of the substrate 100 away from the display function layer 101, and including a first support layer 200c arranged on a side of the extending section c close to the display section a and a second support layer 200a arranged on a side of the display section a close to the extending section c;
- a buffer layer 300, arranged on a side of the second support layer 200a away from the substrate 100; and
- a first adhesive layer 400c, arranged on the first support layer 200c and between the first support layer and the buffer layer 300,
- wherein a distance from an end of the first adhesive layer 400c away from the non-display region 02 to the non-display region 02 is greater than or equal to a distance from an end of the buffer layer 300 away from the non-display region 02 to the non-display region 02.

Specifically, the substrate 100 can include the display section a (the section a in FIG. 2), the extending section c (the section c in FIG. 2), and the bending section b (the section b in FIG. 2) connecting the display section a and the extending section c.

This display section a has a display side and a back side that are opposite in a thickness direction of the display module, and the display function layer 101 of the disclosed embodiment can further be an organic light-emitting diode (OLED) structure.

Specifically, materials of the first support layer 200c and the second support layer 200a can be, but is not limited to, polyethylene terephthalate (PET) or polyimide (PI); and the materials of the first support layer 200c and the second support layer 200a can be the same.

Specifically, the buffer layer 300 can be a multilayer composite structure, and a material thereof includes, but is not limited to, stainless steel (SUS), a foam cushion, or a polyimide film and can alternatively be another material.

It should be noted that a reference plane mentioned in this disclosed embodiment can be a plane perpendicular to the thickness direction of the display module.

Specifically, the first adhesive layer 400c is arranged on the first support layer 200c and between the first support layer and the buffer layer 300. It can be understood that the adhesive layer is in contact with the first support layer 200c and the buffer layer 300, and the buffer layer 300, the first adhesive layer 400c, and the first support layer 200c are stacked in order; and a material of the first adhesive layer 400c can be one or more of an optical clear adhesive layer and a foam adhesive.

Following the above, in this embodiment, the material can be the optical clear adhesive layer, and can be specifically a pressure sensitive adhesive. However, the material of the first adhesive layer 400c of this application is not limited thereto, and all materials that ensure good adhesion performance and further have good bending performance and a good deformation recovery capability fall within the protection scope of this application.

Specifically, when the first adhesive layer 400c is the pressure sensitive adhesive, an actual thickness of the optical clear adhesive layer is calculated according to an actual bending radius; and all material s that can ensure good adhesion performance and further have good bending performance and a good deformation recovery capability fall within the protection scope of this application.

Figure 5:
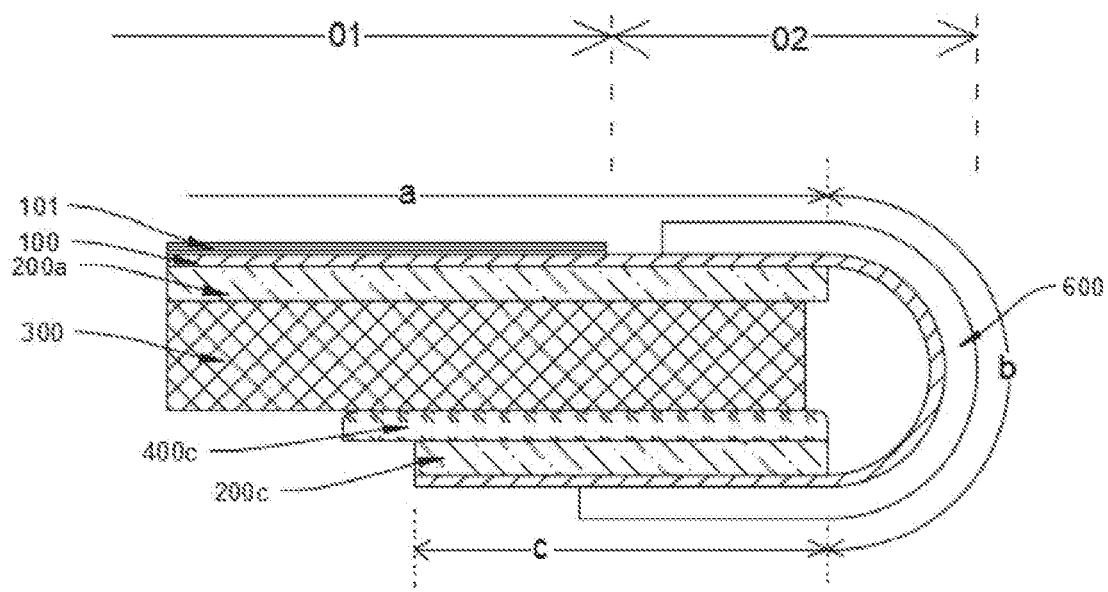
FIG. 5 is a schematic diagram of a structure of a display module of which edges of a first adhesive layer are chamfers in an embodiment of this application.

Specifically, as shown in FIG. 5, edge portions on a side of the first adhesive layer 400c close to the buffer layer 300 can have chamfers at a certain angle, so as to further reduce the risk of producing prints on the display region 01 of the display panel.

It can be understood that the distance from the end of the first adhesive layer 400c away from the non-display region 02 to the non-display region 02 is greater than or equal to the distance from the end of the buffer layer 300 away from the non-display region 02 to the non-display region 02. Specifically, as shown in FIG. 2, a distance from an end 401 of the first adhesive layer 400c to the non-display region 02 is greater than or equal to a distance from an end 201 of the first support layer 200c to the non-display region 02. By using this technical solution, after the buffer layer 300 is thinned as much as possible, the pressure is effectively decreased by increasing the lamination area of the first adhesive layer 400c and the buffer layer 300 during subsequent lamination and binding, thereby solving the problem that in a conventional terminal bending process, in order to achieve a narrow bezel effect, excessive thinning of the buffer layer 300 leads to a decrease in the compression resistance of the buffer layer 300 and to have obvious prints on the first adhesive layer 400c in the display region 01 of the display module, reducing the risk that prints on the adhesive layer appear in the display region of the display module, and solving the problem that compression resistance is weak because the first adhesive layer 400c is located on an inner side of the first support layer 200c and the buffer layer 300 is excessively thin, and further prints are produced on the conventional narrow-bezel display panel, affecting the appearance of the display panel.

In addition, it should be noted that even if a phenomenon of adhesive overflowing is caused since the area of the first adhesive layer 400c is greater than the area of the first support layer 200c, display functions, assembly and appearance of the display panel in the display region 01 will not be affected. Therefore, this phenomenon can be ignored.

In an embodiment, a projection of the first adhesive layer 400c in a direction perpendicular to the buffer layer 300 covers a projection of the first support layer 200c in the direction perpendicular to the buffer layer 300.

Figure 3:
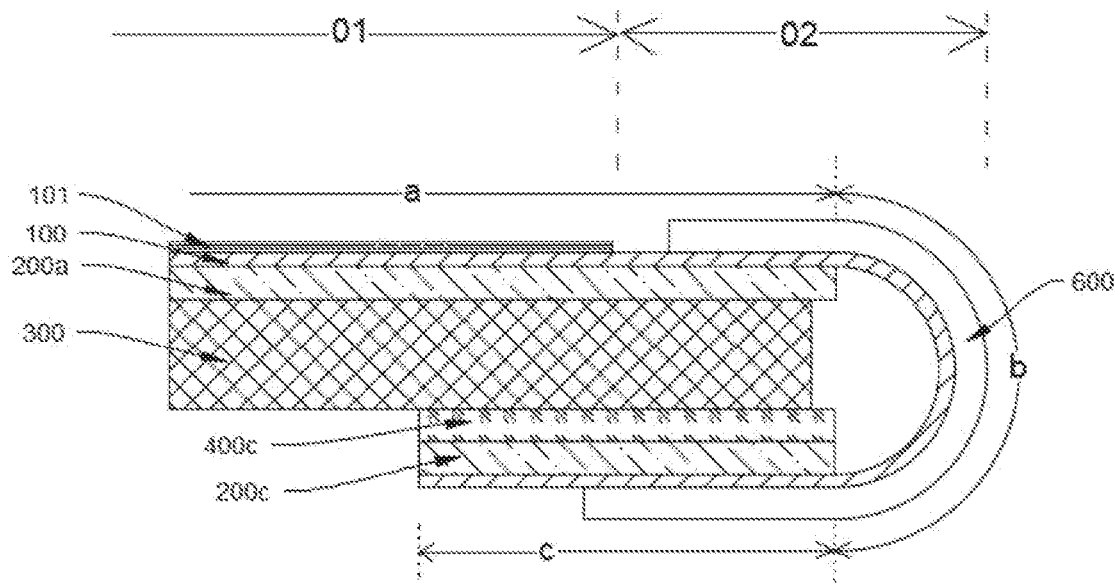
FIG. 3 is a schematic diagram of a structure of a display module including a second adhesive layer in an embodiment of this application.

Following the above, in this embodiment, as shown in FIG. 3, the projection of the first adhesive layer 400c in the direction perpendicular to the buffer layer 300 overlaps with the projection of the first support layer 200c in the direction perpendicular to the buffer layer 300.

It can be understood that, by using this technical solution, the projections of the first adhesive layer 400c and the first support layer 200c in the direction perpendicular to the buffer layer 300 coincide. Further, projections of the first adhesive layer 400c and the first support layer 200c in a direction perpendicular to the substrate 100 overlap, so that the first adhesive layer 400c and the first support layer 200c can be manufactured by the same patterning process, thereby reducing operation steps and production costs.

By using this technical solution, the same patterning process can be used when the support layer and the first adhesive layer 400c are prepared, thereby simplifying the process and effectively reducing the production costs.

In an embodiment, the material of the first adhesive layer 400c includes the pressure sensitive adhesive. Compared with the first adhesive layer 400c obtained when another type of adhesive (such as the foam adhesive) is used as the material, the first adhesive layer 400c obtained when the pressure sensitive adhesive is used as the material can have a better effect of adhering to the first support layer 200c. In addition, in a subsequent display panel cutting process, the cutting difficulty is effectively reduced.

Figure 4:
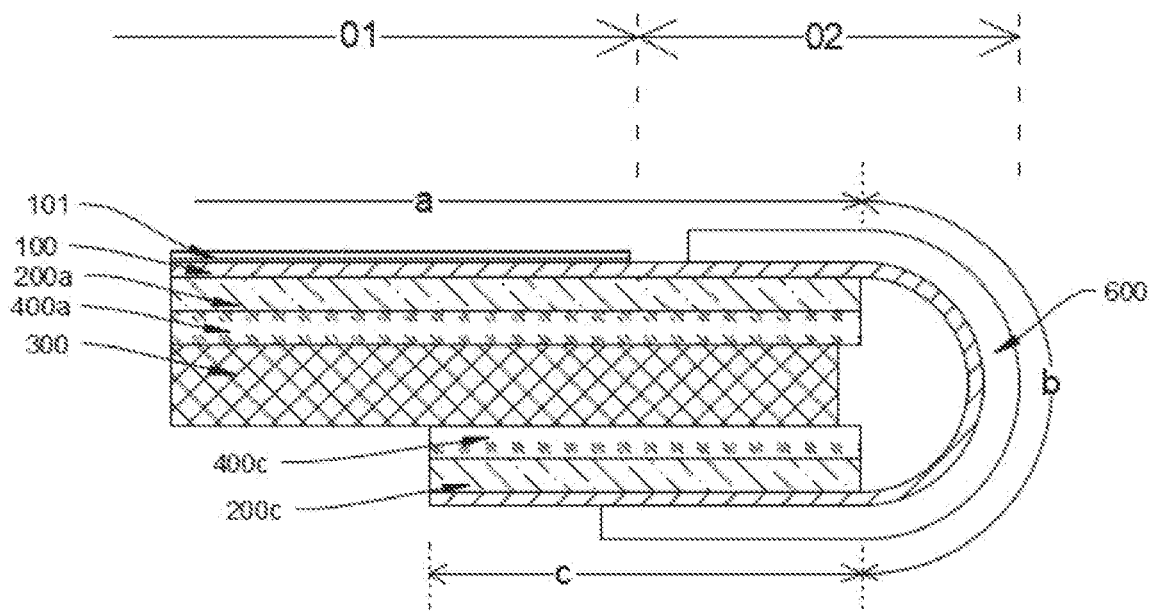
FIG. 4 is a schematic diagram of a structure of a display module including a first adhesive layer in another embodiment of this application.

In an embodiment, as shown in FIG. 4, a second adhesive layer 400a is arranged between the second support layer 200a and the buffer layer 300, and the projection of the second adhesive layer 400a in the direction perpendicular to the buffer layer 300 covers at least the projection of the second support layer 200a in the direction perpendicular to the buffer layer 300.

By using this technical solution, the same patterning process can be used when the support layer, the first adhesive layer 400c, and the second adhesive layer 400a are prepared, thereby simplifying the process and effectively reducing the production costs.

It can be understood that the second adhesive layer 400a is arranged between the second support layer 200a and the buffer layer 300, and when the buffer layer 300 arranged is excessively thin, the second adhesive layer 400a can also have a certain buffering effect, and further bonds the second support layer and the buffer layer 300 to improve the bonding stability of the display panel.

Following the above, in this embodiment, the projection of the second adhesive layer 400a in the direction perpendicular to the buffer layer 300 overlaps with the projection of the second support layer 200a in the direction perpendicular to the buffer layer 300.

Specifically, a material of the second adhesive layer 400a includes one or more of the optical clear adhesive layer and the foam adhesive and can alternatively be a single colloid. This application does not limit the material of the second adhesive layer 400a, and all colloids that can achieve a good adhesion effect fall within the protection scope of this application, and can be specifically selected according to actual production conditions.

Specifically, the materials of the second adhesive layer 400a and the first adhesive layer 400c can be the same or different, and can be adjusted according to actual production needs; and when the materials are the same, the patterning process can be effectively simplified and the production costs can be reduced.

In an embodiment, the display module may further include a strained adhesive layer 600, and the strained adhesive layer 600 covers at least the bending section b.

Specifically, the strained adhesive layer 600 covers an outer side of the bending section b, and covers edge portions of the display section a and the extending section c.

It can be understood that the bending section b of the substrate 100 can be protected by arranging the strained adhesive layer 600 to prevent the bending section b from breaking in the bending process. Specifically, the material of the strained adhesive layer can be an organic adhesive material, and may be specifically a light sensitive adhesive.

Figure 7:
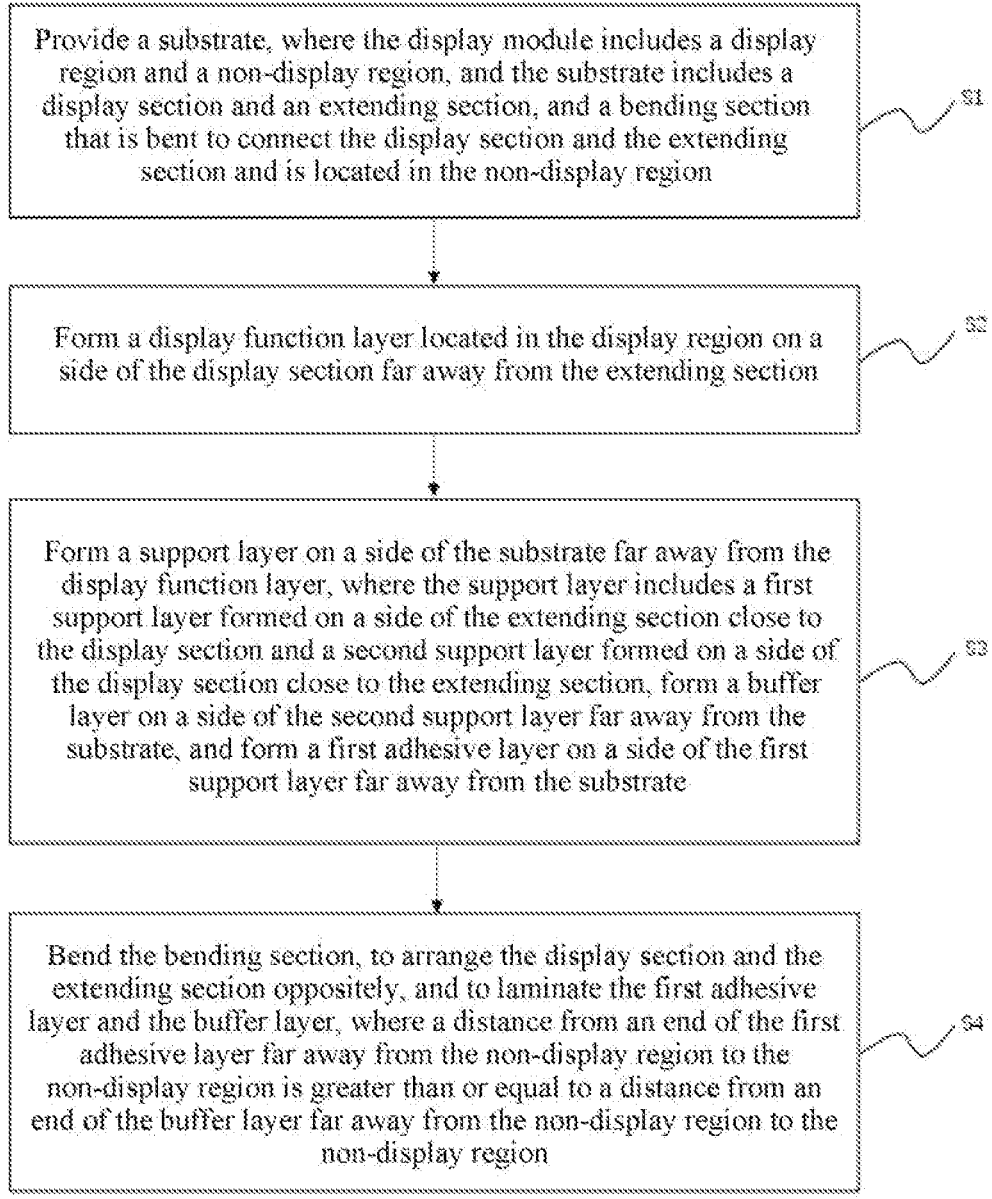
FIG. 7 is a schematic diagram of a manufacturing process of a display module in an embodiment of this application.

This application further provides a manufacturing method of a display module, as shown in FIG. 7, including the following steps:

Step S1. Provide a substrate 100, wherein the display module includes a display region 01 and a non-display region 02, and the substrate 100 includes a display section a and an extending section c, and a bending section b that is bent to connect the display section a and the extending section c and is located in the non-display region 02;

Step S2. Form a display function layer 101 located in the display region 01 on a side of the display section a away from the extending section c;

Step S3. Form a support layer on a side of the substrate 100 away from the display function layer 101, where the support layer includes a first support layer 200c formed on a side of the extending section c close to the display section a and a second support layer 200a formed on a side of the display section a close to the extending section c, form a buffer layer 300 on a side of the second support layer 200a away from the substrate 100, and form a first adhesive layer 400c on a side of the first support layer 200c away from the substrate 100;

Step S4. Bend the bending section b, to arrange the display section a and the extending section c oppositely, and to laminate the first adhesive layer 400c and the buffer layer 300, wherein the distance from the end of the first adhesive layer 400c away from the non-display region 02 to the non-display region 02 is greater than or equal to the distance from the end of the buffer layer 300 away from the non-display region 02 to the non-display region 02.

Figure 6:
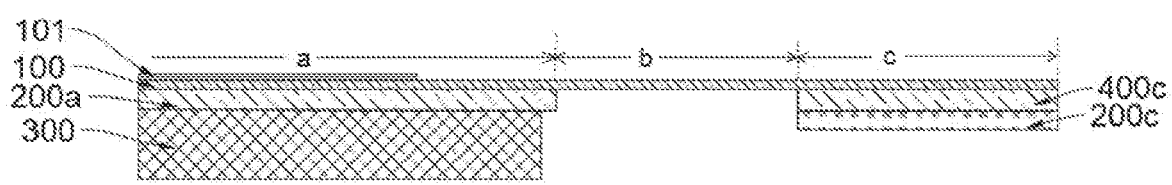
FIG. 6 is a schematic diagram of a structure of a display module before being bent in an embodiment of this application.

Specifically, during the preparation of the display module, the substrate 100 shows a planar structure shown in FIG. 6. The bending section b of the substrate 100 has not been bent, and after the support layer, the buffer layer 300, and the first adhesive layer 400c are formed, the substrate 100 is then bent. After the substrate is bent, a strained adhesive layer 600 can further cover the outside of the bending section b of the substrate 100 in time, and the strained adhesive layer 600 further covers edge portions of the display section a and the extending section c, to protect the bending section b of the display panel and prevent the bending section b from breaking in the bending process.

It can be understood that by integrating the manufacturing processes of the first adhesive layer 400c and the first support layer 200c, one bonding step can be saved, and the number of times of laminating the buffer layer 300 of a product can be reduced, thereby reducing the risk of prints.

In an embodiment, in step S3 of forming a support layer on a side of the substrate 100 far away from the display function layer 101, where the support layer includes a first support layer 200c formed on a side of the extending section c close to the display section a, and forming the first adhesive layer 400c on a side of the first support layer 200c away from the substrate 100:

The first support layer 200c and the first adhesive layer 400c are formed by the same patterning process, so that the projection of the first adhesive layer 400c in the direction perpendicular to the buffer layer 300 overlaps with the projection of the first support layer 200c in the direction perpendicular to the buffer layer 300.

It can be understood that when the materials of the first adhesive layer 400c and the second adhesive layer 400a are the same, the process can be effectively simplified, and the production costs can be reduced.

This application further provides a display apparatus, including the display module in any one of the above embodiments.

In summary, in the present invention, the support layer is arranged on a side of the substrate 100 away from the display function layer 101, wherein the support layer includes the first support layer 200c arranged on a side of the extending section c close to the display section a and the second support layer 200a arranged on a side of the display section a close to the extending section c; and the buffer layer 300 is arranged on a side of the second support layer 200a away from the substrate 100, and the first adhesive layer 400c is arranged on the first support layer 200c and between the first support layer and the buffer layer 300, wherein the distance from the end of the first adhesive layer 400c away from the non-display region 02 to the non-display region 02 is greater than or equal to the distance from the end of the buffer layer 300 away from the non-display region 02 to the non-display region 02. Therefore, the lamination area of the first adhesive layer 400c and the buffer layer 300 is effectively increased, and the pressure is reduced in the subsequent lamination process, thereby solving the problem that in the conventional terminal bending process, in order to achieve the narrow bezel effect, excessive thinning of the buffer layer 300 leads to a decrease in the compression resistance of the buffer layer 300 and to have obvious prints on the first adhesive layer 400c in the display region 01 of the display module, improving the appearance yield of the display module.

In the above embodiments, the description of each embodiment has an emphasis. For parts that are not described in detail in an embodiment, reference may be made to related descriptions of other embodiments.

The embodiments of this application are described in detail above, specific examples are used in this specification to explain the principles and implementations of this application, and the descriptions of the above embodiments are only used to help understand the technical solutions and core ideas of this application. Persons of ordinary skill in the art should understand that the technical solutions recorded in the foregoing embodiments can still be modified, or some of the technical features therein can be replaced equivalently. However, these modifications or replacements do not cause the essence of the corresponding technical solutions to deviate from the scope of the technical solutions of the embodiments of this application.

What is claimed is:

1. A display module, comprising a display region and a non-display region, and comprising:
    a substrate comprising a display section and an extending section that are arranged oppositely, and a bending section that is bent to connect the display section and the extending section and is located in the non-display region;
    a display function layer disposed on a side of the display section away from the extending section and located in the display region;
    a support layer disposed on a side of the substrate away from the display function layer, and comprising a first support layer and a second support layer, wherein a side of the extending section close to the display section is provided with the first support layer, and a side of the display section close to the extending section is provided with the second support layer;
    a buffer layer disposed between the first support layer and the second support layer; and
    a first adhesive layer disposed on the first support layer and between the first support layer and the buffer layer, wherein a distance from an end of the first adhesive layer away from the non-display region to the non-display region is greater than a distance from an end of the first support layer away from the non-display region to the non-display region.

2. The display module according to claim 1, wherein a projection of the first adhesive layer in a direction perpendicular to a surface of the buffer layer facing the first adhesive layer covers a projection of the first support layer in the direction perpendicular to the surface of the buffer layer facing the first adhesive layer.

3. The display module according to claim 2, wherein the projection of the first adhesive layer in the direction perpendicular to the surface of the buffer layer facing the first adhesive layer is coincident with the projection of the first support layer in the direction perpendicular to the surface of the buffer layer facing the first adhesive layer.

4. The display module according to claim 1, wherein material of the first adhesive layer comprises a pressure sensitive adhesive.

5. The display module according to claim 1, wherein a second adhesive layer is arranged between the second support layer and the buffer layer, and a projection of the second adhesive layer in a direction perpendicular to a surface of the buffer layer facing the first adhesive layer covers at least a projection of the second support layer in the direction perpendicular to the surface of the buffer layer facing the first adhesive layer.

6. The display module according to claim 5, wherein the projection of the second adhesive layer in the direction perpendicular to the surface of the buffer layer facing the first adhesive layer overlaps with the projection of the second support layer in the direction perpendicular to the surface of the buffer layer facing the first adhesive layer.

7. The display module according to claim 1, wherein the display module further comprises a strained adhesive layer, the strained adhesive layer is arranged on a side of the substrate away from the support layer, and the strained adhesive layer covers at least the bending section.

8. The display module according to claim 1, wherein a material of the first adhesive layer comprises a pressure sensitive adhesive or a foam adhesive.

9. The display module according to claim 1, wherein a material the buffer layer comprises stainless steel, a foam cushion, or a polyimide film.

\* \* \* \* \*